Patented Mar. 7, 1933

1,900,094

UNITED STATES PATENT OFFICE

RALPH M. BOHN, OF EVANSTON, ILLINOIS

WHEAT FLOUR DILUENT

No Drawing.　　Application filed May 14, 1928. Serial No. 277,800.

This invention relates to a diluent for wheat which is objectionably high in protein content, which diluent at the same time imparts certain desirable characteristics to the flour which peculiarly fit it for the baking of pies, cakes, biscuits, crackers, cookies, and the like, which are best made from flour having a relatively low protein content, or, as it is termed, from soft wheat flour.

The wheat grown in the United States ranges in protein content from about seven percent to sixteen percent, with occasional small quantities above or below these figures. It is generally considered that the strength of wheat flour is proportional to its content of protein, although there are occasional minor exceptions to this rule. Flour made from high protein wheat (above twelve percent protein) is desired chiefly for the manufacture of bread and macaroni, because of its greater strength. Flour made from so-called soft wheat (protein below ten percent) is considered weak, and is very desirable for use in cakes, pies, biscuits, crackers, etc.

The protein content of the wheat grown varies from year to year and from district to district. Occasionally there will be a distinct shortage of soft wheat for the production of flour of the character desired for use in pies, cakes, biscuits, crackers, etc. At all times there is a plentiful supply of wheat of intermediate protein content (ten percent to twelve percent protein).

Flour made from such wheat is too weak for use in bread and too strong for satisfactory use for replacing soft wheat flour; for example, for use in cakes, pies, etc. Wheat of this intermediate strength type is, therefore, usually much lower in price than either high protein strong wheat or low protein soft wheat. If the flour from this intermediate strength wheat could be weakened sufficiently so that it could replace soft wheat without harm to the resulting baked goods, such flour would have a much wider field of use than at present.

The means ordinarily employed for reducing the strength of flour at present is by excessive bleaching, either with chlorine, or with nitrogen trichloride, or both. There are two great objections to the use of over-bleaching for this purpose; first, the difficulty of bleaching uniformly; second, the poor keeping qualities and occasional bad odors of over-bleached flour.

The other method available for weakening wheat flour might be called the dilution process. In this scheme, starch is mixed with the flour. This increases the bulk and weight of the mixture without any increase in total protein contained in the flour. In effect, the protein content of the mixture is lowered and the strength of the mixture is less than that of the original flour, depending on the proportion of added starch. This weakening of flour by dilution with starch has been practiced in a desultory fashion among users of soft wheat flour, especially in cake making. Ordinary corn starch has been the diluent used.

As an example of such dilution: If the flour available has ten percent protein and a protein content of nine percent is desired, a mixture of ninety percent flour and ten percent starch will give a protein content (and hence relative strength) to the mixture of nine percent. Similarly, with flour of ten percent protein available, and a required strength equal to flour of eight percent protein, eighty percent of flour and twenty percent starch may be used. Other mixtures of flour of different protein contents with starch may be used to get almost any conceivable reduction in the strength of the flour, although an excessive addition of corn starch will deleteriously affect the proportion of the resulting mixture.

If a suitable diluting agent for reducing flour strength could be found, which would also beneficially affect the resulting product, it would find a very useful application in the manufacture of cakes, pie crusts, biscuits, crackers, etc. I have found that certain other starches, modified starches, and mixtures of starches, are much more suitable for the purpose of flour dilution than ordinary corn starch. A gelatinized corn or rice starch, made by heating moistened corn or rice starch to the boiling point of water, or slightly below, and drying the starch, has valuable properties for this purpose. It increases the water absorption of the dough, and it has a distinct drying action on dough which contains it. This is of great value in making pie crust, since the highest quality pie crust is made from a dry dough.

Another valuable result of using a starch of this nature in pie dough or cake dough is the saving in shortening which is effected. As is well known, weaker flours require less shortening in pie crusts and less eggs and shortening in cakes than is needed with stronger flours. The use of a gelatinized starch mixed with wheat flour permits of the use of more water and less of the expensive ingredients in pie crusts, cake doughs, cracker doughs, so that its use as a diluent, either singly or in combination with other ingredients next to be described is of great advantage for the reasons stated.

Dextrinized starch has also some valuable properties for use as a flour diluent in the manufacture of pies, cakes, crackers, etc. One of the most desired characteristics of such baked goods is the production of a golden brown color during the baking of the product. Dextrin caramelizes more readily than flour or starch, and its use as a flour diluent is desirable for that reason. The flavor of the baked products is also improved by this treatment.

Corn sugar or dextrose, used in small amounts, may be mixed with the starches or starch derivatives mentioned above, in order to still further enhance the color-producing properties of the products during baking.

I have also found that mixtures of the above three substances, or two of them, with or without the addition of corn starch, which is used as a filler when desired, will combine the advantages of the various starches or starch derivatives to produce the best results when used as flour diluents.

The addition of corn starch further serves to prevent lumping of the gelatinized starch in water.

A mixture of 90% gelatinized starch and 10% dextrose has remarkable water-absorbing capacity along with the ability to produce a good bloom or color during baking.

A mixture of 50% gelatinized starch and 50% dextrin may be used where less water absorption is desired.

A mixture of 80—50% gelatinized starch and 20—50% untreated corn starch may be used where bloom-producing properties are not desired.

A mixture of 40% gelatinized starch, 30% corn starch, and degradation products of starch consisting of 20% dextrin and 10% dextrose, has been found to combine the various desirable properties to good advantage.

The use of dextrose and/or dextrin as above indicated improves the water absorptive capacity of the mixture when combined with the gelatinized starch and a hard wheat flour. Without the use of these materials, it is difficult to mix the gelatinized starch with the flour in a satisfactory manner and the ordinary mixing equipment in bakeries does not agitate the mass sufficiently to give a thorough separation and distribution of the particles which tend to cause small lumps. However, if the gelatinized starch is thoroughly mixed with dextrose or dextrin in substantially the amounts above indicated, the dispersion of the gelatinous starch is aided and the coalescence of the starch particles is prevented by their previous separation by the dextrinous non-coalescing materials so that in the combined relation above indicated, the utility of the mixture is materially increased.

The above mixtures, or similar mixtures containing the ingredients above specified, or some of them, may be added to the wheat flour in the necessary quantity to reduce the protein content of the resulting mixture to the desired percentage, and at the same time the resulting mixture will possess the special, peculiar or desirable properties which result from the use of the added ingredients, so that the resulting flour will possess certain properties not present in untreated soft wheat flour having the desired protein content in the first instance.

I do not bind myself to the above mixtures, as many other mixtures, such as a mixture of dextrin and dextrose, which aids in the spreading of dropped cookies, may be used.

I claim:

1. A non-fermenting wheat flour compound of reduced and relatively low protein content essential for the production of pastry dough and other soft flour products, said compound consisting of an intimate mixture containing a preponderance of relatively hard wheat flour of undesirably high protein content, a less proportion of gelatinized starch to dilute and reduce the protein content of the mixture to substantially that of soft flour and impart water absorbing properties, a still smaller proportion of degradation products of starch including dextrose and dextrin to impart color-producing properties and flavor to the baked product and a further relatively smaller proportion of corn starch to prevent lumping of the gelatinized starch in water, whereby the easily obtainable hard flour of intermediate and undesirable protein content may be utilized for the production of soft flour.

2. A mixture for use in diluting wheat flour of undesirable protein strength to produce a weaker flour having suitable and desirable characteristics for baked products, said mixture comprising a preponderance of gelatinized starch to impart water absorbing properties, a smaller proportion of starch degradation products including dextrose and dextrin for imparting color producing properties, and a proportion of corn starch substantially equal to that of said starch degradation products, for preventing lumping of the gelatinized starch with water, said mixture being intimately combined and adapted when used as a flour diluent to produce a synthetic soft wheat flour of proper protein content.

3. A mixture for use in diluting wheat flour of undesirable protein strength to produce a weaker flour having suitable and desirable characteristics for baked products, said mixture comprising substantially forty percent gelatinized starch to impart water absorbing properties, approximately thirty percent corn starch for preventing lumping of the gelatinized starch with water, and an amount of starch degradation products including substantially twenty percent dextrin and ten percent dextrose for imparting color producing properties, said mixture being intimately combined and adapted when used as a flour diluent to produce a synthetic soft wheat flour of proper protein content.

In witness that I claim the foregoing I have hereunto subscribed my name this 11th day of May, 1928.

RALPH M. BOHN.